United States Patent
Principe et al.

(10) Patent No.: US 8,611,839 B2
(45) Date of Patent: Dec. 17, 2013

(54) ROBUST SIGNAL DETECTION USING CORRENTROPY

(75) Inventors: Jose C. Principe, Gainesville, FL (US); Weifeng Liu, Seattle, WA (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 945 days.

(21) Appl. No.: 12/597,561

(22) PCT Filed: Apr. 26, 2007

(86) PCT No.: PCT/US2007/067505
§ 371 (c)(1),
(2), (4) Date: Jan. 28, 2010

(87) PCT Pub. No.: WO2008/133679
PCT Pub. Date: Nov. 6, 2008

(65) Prior Publication Data
US 2010/0197258 A1    Aug. 5, 2010

(51) Int. Cl.
*H04B 1/16* (2006.01)
*H04B 17/00* (2006.01)

(52) U.S. Cl.
USPC .......... 455/214; 455/227; 455/228; 455/229; 455/296; 455/67.13

(58) Field of Classification Search
USPC .............. 455/214, 227, 228, 229, 296, 67.13
See application file for complete search history.

(56) References Cited

U.S. PATENT DOCUMENTS

| 4,899,289 | A  | * | 2/1990 | Appel | 702/74 |
| 5,668,778 | A  | * | 9/1997 | Quazi | 367/135 |
| 7,236,538 | B1 | * | 6/2007 | Banister | 375/267 |
| 8,244,787 | B2 | * | 8/2012 | Principe et al. | 708/322 |
| 2002/0191325 | A1 | * | 12/2002 | Smith et al. | 360/75 |
| 2004/0228270 | A1 | * | 11/2004 | Chen et al. | 370/210 |
| 2005/0149296 | A1 | * | 7/2005 | Sieracki | 702/189 |
| 2006/0220945 | A1 | * | 10/2006 | Ohtake et al. | 342/70 |

FOREIGN PATENT DOCUMENTS

WO    PCT/US06/033956 A2    3/2007

OTHER PUBLICATIONS

Xu, Jian-Wu, Pokharel, Puskal P., Paiva, Antonio R.C., and Principe, Jose C., "Nonlinear Component Analysis Based on Correntropy," 20006 International Joint Conference on Neural Networks, Vancouver, BC, Jul. 16-21, 2006, pp. 1851-1855.

(Continued)

*Primary Examiner* — Wen Huang
(74) *Attorney, Agent, or Firm* — Thomas Horstemeyer, LLP (57) ABSTRACT

A method (200) for detecting a periodic signal (141) in a noisy signal (101) is provided. The method can include applying (210) correntropy to the noisy signal to generate a non-linear mapping, and applying (220) a sub-space projection to the non-linear mapping to produce principal components. A correntropy kernel can be applied to the noisy signal to generate a Gram matrix that is used in a Temporal Principal Component Analysis (TPCA). The correntropy kernel projects nonlinearly the input data to a reproducing kernel Hilbert Space (RKHS) preserving the input time structure and attenuating impulsive noise. The correntropy kernel is data dependent, and the RKHS correlation matrix has the same dimension as the input data correlation matrix. A principal component having a majority of signal energy can be chosen (230) to detect the periodic signal.

24 Claims, 6 Drawing Sheets

CORRENTROPY                                                    311

Apply a Gaussian kernel to map the input data to a reproducing kernel Hilbert Space (RKHS)

$$E[\eta_x(i) \cdot \eta_x(j)] = E[\kappa(x(i) - x(j))]$$

Autocorrelation    Kernel    Input Data

RKHS same dimension as Input data    Kernel is independent of input data (56) References Cited

OTHER PUBLICATIONS

Slavnicu, Stefan, Ciochina, Silviu, "Subspace Method Optimized for Tracking Real-Valued Sinusoids in Noise," Politechnica, University of Bucharest, Splaiul Independentei, 313, Bucharest, Romania, pp. 697-700.

Zhang, Qing, and Brown, L.J., "Noise Analysis of an Algorithm for Uncertain Frequency Identification," IEEE Transaction on Automatic Control, vol. 51, No. 1, Jan. 2006, pp. 103-110.

\* cited by examiner

CORRENTROPY 311

Apply a Gaussian kernel to map the input data to a reproducing kernel Hilbert Space (RKHS)

$$E[\eta_x(i) \cdot \eta_x(j)] = E[\kappa(x(i) - x(j))]$$

- Autocorrelation
- Kernel
- Input Data

RKHS same dimension as Input data

Kernel is independent of input data

| A | CTPCA | Centering CTPCA | PCA by N-by-N Gram R (N=256) | PCA by L-by-L autocorrelation matrix (L=4) | PCA by L-by-L autocorrelation matrix (L=30) | PCA by L-by-L autocorrelation matrix (L=100) |
|---|---|---|---|---|---|---|
| 5 | 100% | 100% | 15% | 3% | 4% | 8% |
| 4 | 100% | 100% | 27% | 6% | 9% | 17% |
| 2 | 100% | 100% | 99% | 47% | 73% | 90% |

FIG. 8

| Kernel size | Centering CTPCA |
|---|---|
| 0.1 | 48% |
| 0.5 | 93% |
| 1.0 | 100% |
| 1.5 | 99% |
| 2.0 | 98% |
| 3.0 | 95% |
| 3.5 | 90% |
| 4.0 | 83% |
| 8.0 | 10% |

FIG. 9

ROBUST SIGNAL DETECTION USING CORRENTROPY

STATEMENT AS TO FEDERALLY SPONSORED RESEARCH

The invention was made with U.S. government support under grant number ECS-0601271 awarded by the National Science Foundation. The U.S. government has certain rights in the invention.

CROSS REFERENCE TO RELATED APPLICATION

This application claims priority to "Robust Signal Detection Using Correntropy,"having serial number PCT/US2007/067505, filed on Apr. 26, 2007.

FIELD OF THE INVENTION

The present invention relates to the field of signal processing, and more particularly, to detecting a low-level periodic signal in a high noise environment.

BACKGROUND

Detecting low-level information carrying signals in high-level noise is a challenging task. Various signal processing techniques exist for separating noise components from information carrying signals. Performance of the various signal processing techniques may depend on the characteristics of noise and the characteristics of the information carrying signal. As an example, statistical signal processing methods can incorporate noise statistics for modeling the noise source and removing the noise. Signal processing methods can project the noisy signal into multiple subspaces in an attempt to separate the noise components from the information carrying components. Principal Component Analysis is one such method which decomposes a noisy signal into multiple principal components. The information carrying components may be distributed to only a few principal components, depending on the projection. However, PCA is data dependent and the projection may not effectively separate the information carrying signal from the noise signal.

Accordingly a need exists for a method of robust signal detection that is data independent.

SUMMARY

One embodiment is a method for detecting a periodic signal in noise. The method can include applying correntropy to a noisy signal to generate a non-linear mapping, and applying a sub-space projection to the non-linear mapping to produce principal components. A non-linear autocorrelation matrix of the input signal can be generated from the non-linear mapping. In practice, a correntropy kernel can be applied to the noisy signal to generate the non-linear autocorrelation matrix. The correntropy kernel maps the input data to a reproducing kernel Hilbert Space (RKHS). In one configuration, as a result of the non-linear mapping, the non-linear autocorrelation matrix can be represented as a Gram matrix. A size of the correntropy kernel can also be chosen to generate the Gram matrix and adjust a detection performance. Thereafter, a Temporal Principal Component Analysis (TPCA) can be performed on the Gram matrix. TPCA can include applying an eigen-decomposition to the Gram matrix to produce eigenvectors of the principal components. In one arrangement, a length of the Gram matrix can be chosen to correspond to a desired number of principal components. The method can further include choosing a principal component having high energy for detecting the periodic signal. To detect the periodic signal, a power spectral density (PSD) of the correntropy derived principal component, and a maximum peak in the PSD can be identified, wherein the maximum peak corresponds to the periodic signal. In one arrangement, the spectral analysis can be performed on a second principal component that does not have a mean bias. More generally, a PSD analysis of any component that contains the signal of interest or any of its parts can be performed.

Another embodiment is a method for Correntropy Principal Component Analysis (CPCA). The method can include applying correntropy to an input data to generate a non-linear autocorrelation matrix, and performing Principal Component Analysis on the non-linear autocorrelation matrix to produce correntropy principal components. Correntropy can project the input data to a linear reproducing kernel Hilbert Space (RKHS) to produce the non-linear autocorrelation matrix. More specifically, a correntropy kernel can be applied to the input data to map the input data to a reproducing kernel Hilbert Space (RKHS). The correntropy kernel can induce a scalar non-linear mapping that retains a measure of similarity in the input data. The RKHS can have a same dimension as the input data, and the correntropy kernel is data independent.

Yet another embodiment is a computer programmable readable storage medium having computer instructions for applying correntropy to an input data to generate a Gram matrix, and performing Principal Component Analysis (PCA) on the Gram matrix to produce correntropy principal components. A Gaussian kernel can be applied to the input data to generate entries of the Gram matrix. In such regard, the Gaussian kernel induces a non-linear mapping in a linear reproducing kernel Hilbert Space. The Gram matrix can have an input dimension equal to a number of desired principal components. Principal components having a highest energy can be selected for detecting a periodic signal in the input data.

BRIEF DESCRIPTION OF THE DRAWINGS

Various features of the system are set forth with particularity in the appended claims. The embodiments herein, can be understood by reference to the following description, taken in conjunction with the accompanying drawings, in which:

DETAILED DESCRIPTION

Figure 1:
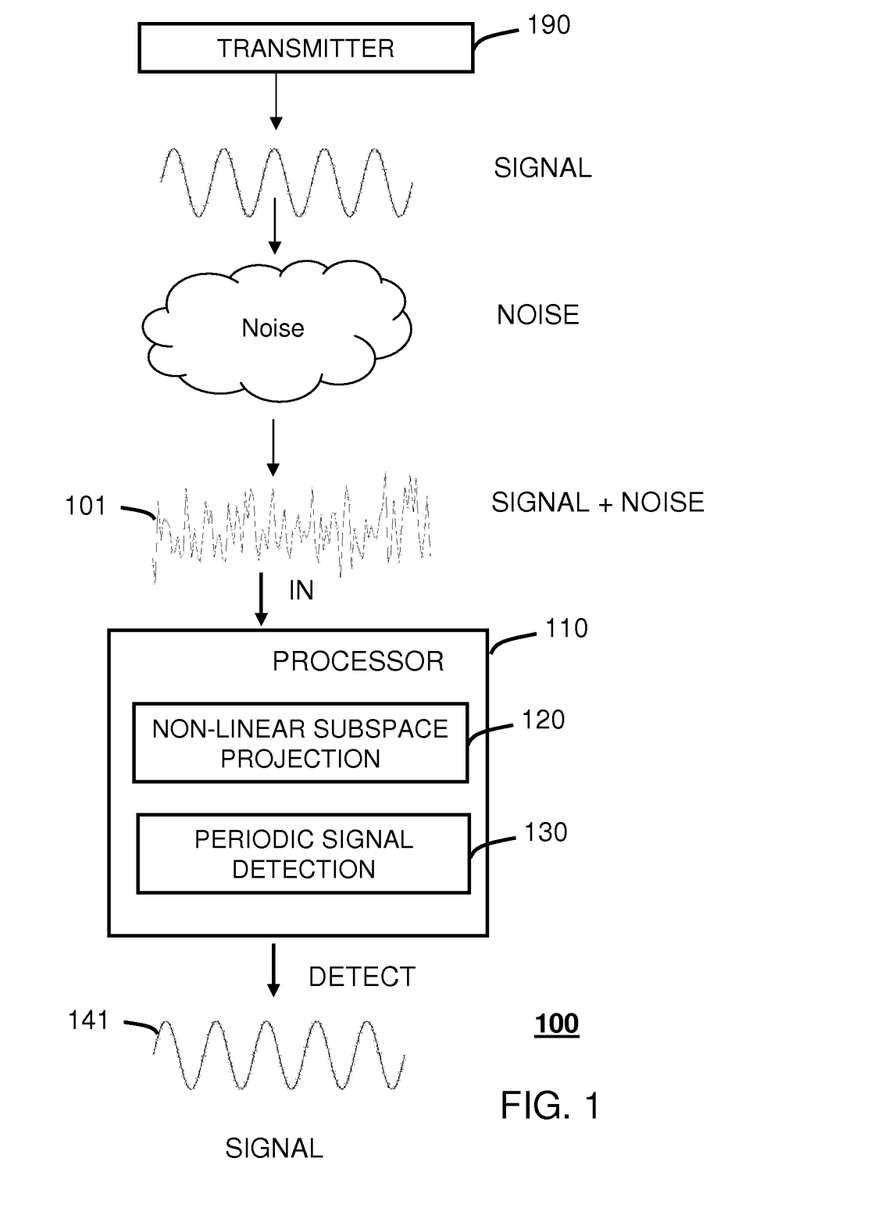
FIG. 1 is a schematic diagram of a processor employing correntropy in accordance with one embodiment of the invention.

Broadly stated, embodiments of the invention are directed to robust signal detection using correntropy. Referring to FIG. 1, an exemplary communication system 100 is shown. The exemplary communication system can include a transmitter 190 that transmits a periodic signal (e.g. sine wave) and a receiver having a processor 110 that receives the periodic signal. During transmission, the periodic signal may be corrupted by noise such as channel noise or environmental noise. The signal to noise ratio (SNR) of the periodic signal may be very low compared to the noise components as a result of the transmission or the communication environment. The processor 110 can monitor and detect a faint periodic signal 141 in the noisy signal 101 using methods of correntropy herein presented.

The noisy signal 101 may be a communication signal having a periodic carrier component, a medical signal having a fundamental frequency, a voice signal having a fundamental pitch, a surveillance signal having a periodic beacon signal, a radar signal having a periodic component, or any other periodic signal corrupted by noise. Broadly stated, the processor 110 can non-linearly project the noisy signal 101 (signal 141 plus noise) to a subspace to increase a signal to noise ratio (120), and then detect the periodic signal 141 in a subspace projection that has a higher signal to noise ratio (130). The non-linear projection allows the processor 100 to more effectively detect the periodic signal 141 in the noisy signal 101.

Figure 2:
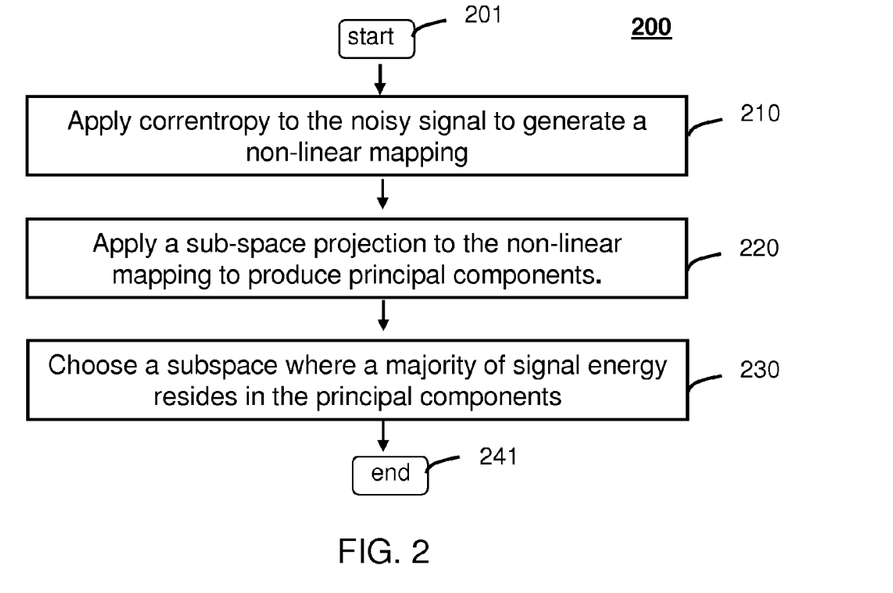
FIG. 2 is a method for detecting a periodic signal in noise using correntropy in accordance with one embodiment of the invention.

Referring to FIG. 2, a method 200 for detecting a faint periodic signal in a noisy signal is shown. The method 200 can be practiced with more or less than the number of steps shown. Moreover, the method 200 is not limited to the order shown in FIG. 2. Reference will be also made to FIGS. 3-6 when discussing method 200. The method 200 can start in state 201 wherein the processor 100 receives the noisy signal 101, having a low level periodic signal 141.

At step 210 the processor 100 can apply correntropy on the noisy signal to generate a non-linear mapping. Briefly, correntropy can be defined as a generalized similarity measure between two variables X and Y defined by $$V_\sigma(X,Y)=E[\kappa_\sigma(X-Y)] \quad (1)$$

where $\kappa_\sigma(x-x_i)$ is the Gaussian kernel that provides a non-linear mapping, $$K_\sigma(x-x_i) = \frac{1}{\sqrt{2\pi\sigma}}\exp\left(-\frac{(x-x_i)}{2\sigma^2}\right) \quad (2)$$

The Gaussian kernel can be substituted by any other positive definite function. When detecting a low-level periodic signal in a noisy signal, the similarity measure of EQ (1) evaluates the similarity for multiple samples of the noisy signal. The noise may be Gaussian or non-Gaussian. More specifically, the X and Y variables correspond to time delayed samples of the noisy signal and are used in EQ (1) to evaluate a correlation in a non-linear domain. In practice, a joint PDF for the variables X and Y is unknown and only a finite number of data $\{(x_i,y_i)\}_{i=1}^N$ are available, leading to the sample estimator of correntropy $$\hat{V}_{N,\sigma}(X,Y) = \frac{1}{N}\sum_{i=1}^{N}K_\sigma(x_i-y_i) \quad (3)$$

At step 220, the processor 100 can apply a sub-space projection to the non-linear mapping to produce principal components. Briefly, the processor 100 applies a subspace projection to the non-linear mapping to decompose the noisy signal 101 into principal components (e.g. sub-spaces). As a result of the non-linear mapping, one of the principal components contains a majority of the periodic signal 141 energy at a high signal to noise ratio. When the noise in the noisy signal 101 is large and uncorrelated, the noise power is divided equally among the principal components, while the periodic signal 141 is concentrated in primarily only one of the principal components.

At step 230, the processor 100 can choose a principal component having a majority of overall signal energy. As previously noted, the noise power is divided equally by the principal components as a result of the sub-space projection, while the periodic component 141 is concentrated in one of the principal component directions. Hence, signal to noise ratio is increased and detection of the signal may be accomplished with more robust performance. Accordingly, the processor 100 can more accurately detect the periodic component in the principal components with the higher overall energy, which corresponds to the principal component with the higher signal to noise ratio. At step 241, the method 200 can end.

Figure 3:
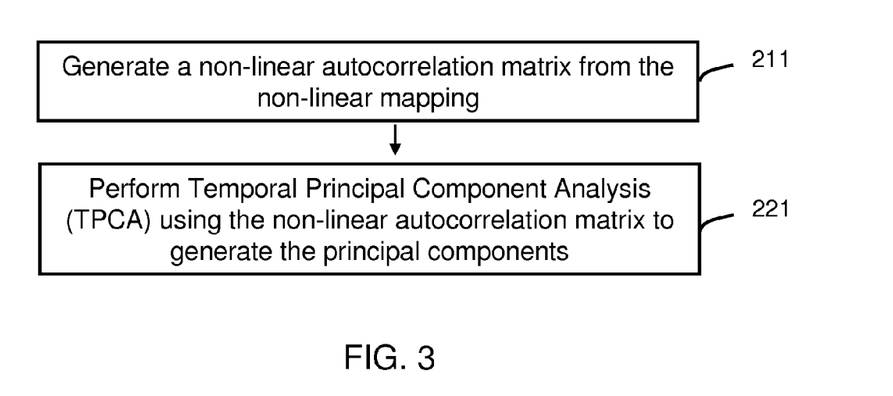
FIG. 3 is more detailed method for correntropy in accordance with one embodiment of the invention.

FIG. 3 shows a more detailed approach to the method steps 200 of FIG. 2. At step 211, the processor 100 can generate a non-linear autocorrelation matrix as a result of the non-linear mapping. The non-linear autocorrelation matrix is generated from a non-linear mapping of the correntropy analysis of EQ 1. The sample estimator of correntropy shown in EQ 3 uses a correntropy kernel (e.g. Gaussian kernel), K. The correntropy kernel, K, induces a scalar nonlinear mapping η which maps the noisy signal, where $\{x_i\}_{i=1}^N$ is the noisy signal data set, as $\{\eta_x(i)\}_{i=1}^N$ while preserving the similarity measure, as shown below:

$$E[\eta_x(i)\cdot\eta_x(i+t)]=V(i,i+t)=E[\kappa(x(i)-x(i+t))],$$

$$0\leq t\leq N-1 \quad (4)$$

where x(i)–x(i+t) is the similarity measure of EQ (1) that is non-linearly mapped to a multiplication of $\eta_x(i)\eta(i+t)_x$ as a result of the correntropy kernel, K. The term $\eta_x(i)\eta(i+t)_x$ represents the non-linear autocorrelation of the noisy signal.

Based on EQ (4), the non-linear autocorrelation matrix (e.g. left side of EQ 4, "non-linear mapping") can be generated by applying correntropy analysis (e.g. right side of EQ 4, "similarity measure") to the noisy signal 141. That is, the non-linear autocorrelation matrix is generated by applying correntropy to the noisy signal 141 on a sample-by-sample basis over time. Moreover, when $m_\eta$ denotes the mean of the transformed data, then the square of $m_\eta$ is an asymptotic estimate of the information potential of the original data as N→∞, i.e.

$$m_\eta^2 = \frac{1}{N^2}\sum_{i=1}^{N}\sum_{j=1}^{N}K(x(i)-x(j)) \quad (5)$$

At step 221, the processor 100 can perform Temporal Principal Component Analysis (TPCA) on the non-linear autocorrelation matrix to generate the principal components. TPCA is a method of sub-space projection that decomposes a signal into principal components (See step 220 FIG. 2). Recall, the non-linear autocorrelation matrix is generated by a non-linear mapping of the correntropy kernel, K, as shown in EQ (4). In such regard, the principal components can be directly generated from correntropy. Moreover, the kernel, K, is data independent. Furthermore, the size of the correntropy kernel can be selected so as to project the data in a principal component having the same dimension as the noisy data. The size can also be selected to generate the size of the non-autocorrelation matrix. One unique arrangement of the non-linear autocorrelation matrix based on the kernel size allows for a data independent transformation using TCPA. That is, when the non-linear autocorrelation matrix is arranged as a Gram matrix the principal components can be directly generated from the input data (e.g. noisy signal 101).

In conventional PCA, an autocorrelation matrix is used to generate principal components. In the current embodiment, the autocorrelation matrix is replaced with the Gram matrix for TPCA, wherein the Gram matrix is generated as a result of the correntropy kernel. In the foregoing, a brief description of TPCA with regard to the autocorrelation matrix and Gram matrix is provided. Suppose the noisy signal 141 is $\{x(i), i=1, 2, \ldots, N+L-1\}$ and is mapped as a trajectory of N points in the reconstruction space of dimension L. With the data matrix $$X = \begin{bmatrix} x(1) & x(2) & \ldots & x(N) \\ \vdots & \vdots & \ddots & \vdots \\ x(L) & x(L+1) & \ldots & x(N+L-1) \end{bmatrix}_{L \times N} \quad (6)$$

Principal Component Analysis estimates the eigen-filters and principal components (PC). An autocorrelation matrix and Gram matrix of the noisy signal 141 are denoted as R and K respectively, and written as $$R = XX^T \approx N \times \begin{bmatrix} r(0) & r(1) & \ldots & r(L-1) \\ r(1) & \ddots & \ddots & \vdots \\ \vdots & \ddots & r(0) & r(1) \\ r(L-1) & \ldots & r(1) & r(0) \end{bmatrix}_{L \times L} \quad (7)$$

$$K = X^T X \approx L \times \begin{bmatrix} r(0) & r(1) & \ldots & r(N-1) \\ r(1) & \ddots & \ddots & \vdots \\ \vdots & \ddots & r(0) & r(1) \\ r(N-1) & \ldots & r(1) & r(0) \end{bmatrix}_{N \times N} \quad (8)$$

where $r(k)=E[x(i)x(i+k)]$ is the autocorrelation function of X. When N and L are large, EQ (7) and EQ (8) are good approximations of the autocorrelation. In the following derivation, L is adjustable, and can be set appropriately to the signal detection application. That is, L can be set as a function of the input data dimension. Assuming L<N, by Singular Value Decomposition (SVD)

$$X = UDV^T \quad (9)$$

where U, V are two orthonormal matrices and D is a pseudo-diagonal L×N matrix with singular values $\{\sqrt{\lambda_1}, \sqrt{\lambda_2}, \ldots \sqrt{\lambda_L}\}$ as its entries. In PCA the singular values are the eigen values of the eigen vectors. Therefore, $$R = XX^T = UDD^T U^T \quad (10)$$

$$K = X^T X = VD^T DV^T \quad (11)$$

From EQ (10) and EQ (11), the columns of U and V are eigenvectors of R and K respectively. Rewriting (9) as $$U^T X = DV^T \quad (12)$$

or equivalently, $$U_i^T X = \sqrt{\lambda_i} V_i^T, i=1, 2, \ldots, L \quad (13)$$

Here $U_i$ and $V_i$ are the i-th columns of U and V respectively. This equation reveals that the data (X) projected onto the i-th eigenvector ($U_i$) of R (e.g. left side of EQ 13) is exactly the scaled ($\sqrt{\lambda_i}$) i-th eigenvector ($V_i$) of K (e.g. right side of EQ 13). EQ (13) indicates that the principal components can be obtained directly from the Gram matrix (e.g. $V_i$) without dependence on the input data (X). In contrast, the autocorrelation matrix (e.g. $U_i$) requires the input data (X) to be projected for generating the principal components, thus establishing a dependence on the input data. Accordingly, it can be noted from EQ (13), that the principal components can be obtained by 1) eigen-decomposing the autocorrelation matrix and then projecting the data, or by 2) eigen-decomposing the Gram matrix directly. Notably, the latter method of using the Gram matrix is a data independent approach.

Moreover, as shown in EQ (6), there exists a scalar nonlinear mapping $\eta(\cdot)$ which maps the signal as $\{\eta_x(i), i=1, 2, \ldots, N+L-1\}$ while preserving the similarity measure $$E[\eta_x(i) \cdot \eta_x(j)] = E[\kappa(x(i) - x(j))] \quad (14)$$

As shown in EQ (14), correntropy includes evaluating a similarity measure of time shifted input data x(i)–x(i+t), and applying a Gaussian kernel, K, to the similarity measure to generate entries of the non-linear autocorrelation matrix $\eta_x(i) \eta(j)_x$. Notably, the autocorrelation function of $\eta_x(i)$ is given by the correntropy function of x. It should be noted that EQ (14) provides a correntropy extension to temporal PCA. More specifically, the correntropy extension to TPCA replaces auto-correlation entries of EQ (8) with correntropy entries from EQ (14). Furthermore, the principal components can be obtained by eigen-decomposition of the Gram matrix, K, directly in a data independent manner.

Figure 4:
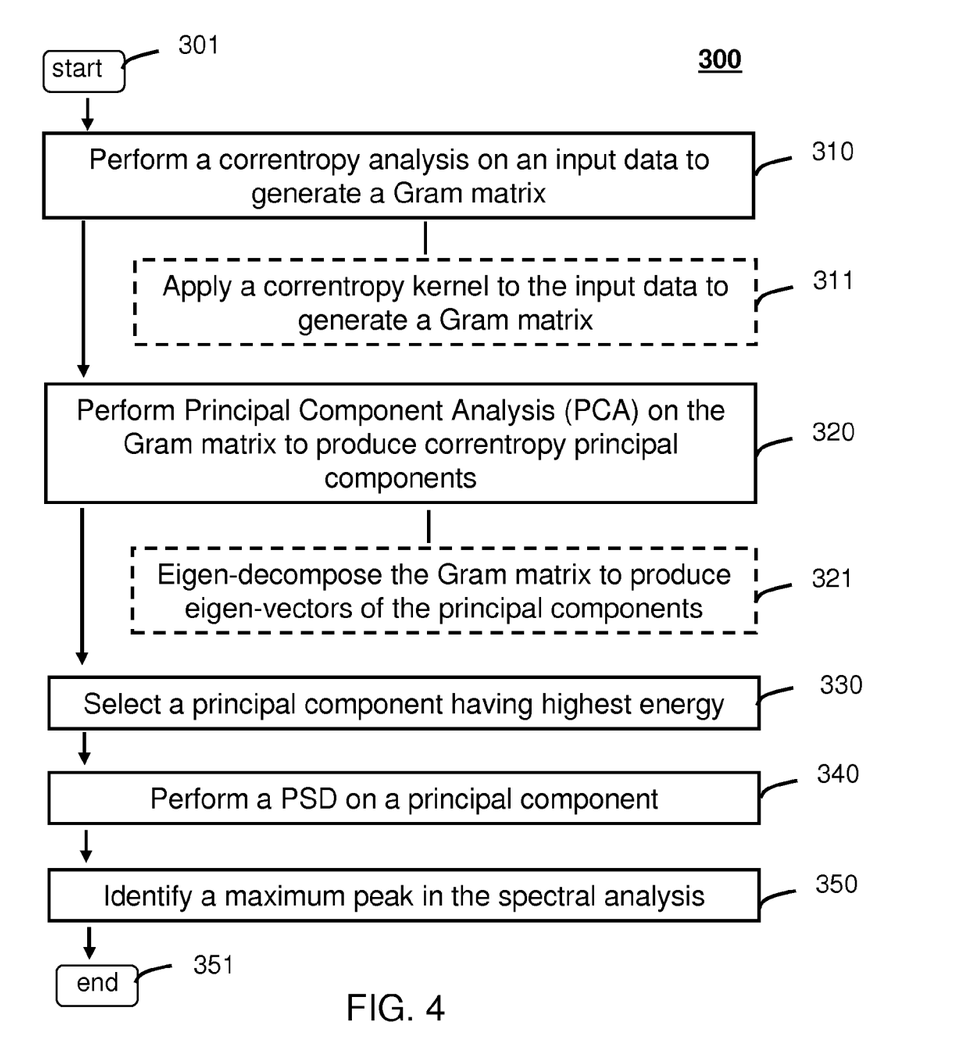
FIG. 4 is a method for Correntropy Principal Component Analysis (CPCA) in accordance with the invention.
Figure 5:
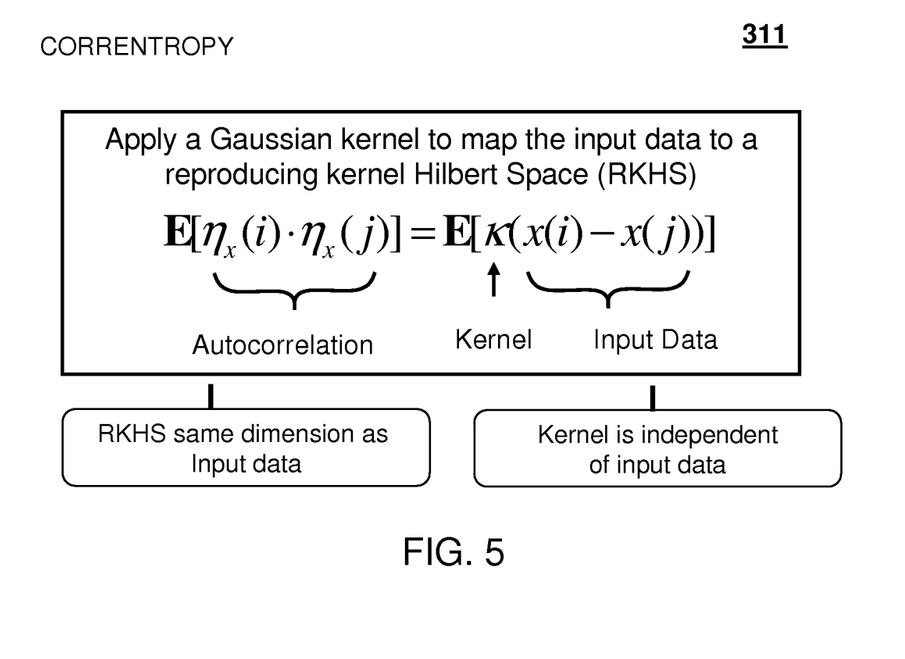
FIG. 5 is a non-linear mapping of correntropy in accordance with the invention.

Referring to FIG. 4, a method 300 for correntropy principal component analysis (CPCA) is shown. The method 300 can be practiced with more or less than the number of steps shown. Moreover, the method 300 is not limited to the order shown in FIG. 4. The method 300 can start in state 301 wherein the processor 100 receives the noisy signal 101 having a low level periodic signal 141 corrupted by noise.

At step 310, the processor 100 (FIG. 1) can perform a correntropy analysis on the noisy signal 141 to generate a Gram matrix in accordance with the method steps of FIG. 2. In particular, the processor 100 can apply a correntropy kernel (e.g. Gaussian kernel) to the input data to generate the Gram matrix as shown in step 311. Step 311 is a specific implementation of correntropy analysis that corresponds to method step 210 of FIG. 2 for generating a non-linear mapping. Briefly referring to FIG. 5, method step 311 can include applying a Gaussian kernel to map the input data to a reproducing kernel Hilbert Space (RKHS). As shown in EQ (13), the non-linear autocorrelation matrix is generated by applying a Gaussian kernel to the input data. The Gaussian kernel produces a non-linear mapping of the input data.

Returning back to FIG. 4, at step 320, the processor 100 can perform Principal Component Analysis (PCA) on the Gram matrix to produce correntropy principal components. In particular, the processor 100 can eigen-decompose the Gram matrix to produce eigen vectors of the principal components as shown in step 321. Step 321 is a specific implementation of applying a subspace projection that corresponds to method step 220 of FIG. 2. The non-linear mapping of applying the correntropy kernels implicitly projects non-linearly the input data to a reproducing kernel Hilbert space (RKHS), which is a linear space. Temporal PCA is performed in the RKHS for distributing noise among principal components. Because RKHS is a linear space, measures of similarity such as distance in the input data space are preserved. Moreover, using a correntropy kernel to non-linearly map the input data to a RKHS allows for the RKHS to have a same dimension as the input data. Furthermore, the correntropy kernel is independent of the input data as shown by EQ (13).

At step 330, upon determining the principal components, the processor 101 can identify the principal component having the highest energy. Step 330 is a specific implementation for choosing a subspace that corresponds to method step 230 of FIG. 2. Recall, TCPA equally distributes the noise energy among the principal components while preserving the periodic signal in one, or only a few, principal components. At step 340, the processor 101 can perform a power spectral density (PSD) of the correntropy on a high energy principal component. As an example, a Fast Fourier Transform (FFT) may be applied to the principal component in a digital domain to produce a spectrum. As another example, a bank of bandpass filters can be applied to the principal component in the analog domain to produce a spectrum. At step 350, the processor 101 can identify a maximum peak in the spectral analysis. At step 351, the method 300 can end.

Figure 6:
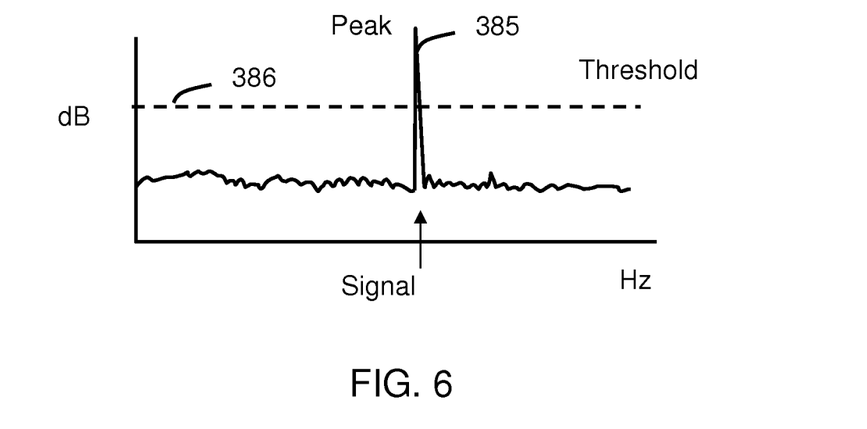
FIG. 6 is a correntropy power spectrum in accordance with the invention.

For example, FIG. 6 shows an exemplary FFT of a principal component. The FFT reveals a peak 385 that corresponds to a frequency of the periodic signal 141. A threshold detector can be employed to identify peaks in the spectrum. For example, any frequency components that exceed a threshold 386 can be considered a candidate for the periodic signal 141. Notably, the peak is enhanced (e.g. magnitude) due to a higher signal to noise ratio of the principal component as a result of TCPA. Moreover, the principal component was generated directly from the noisy signal 101 using correntropy in a data independent manner.

The method of correntropy TPCA can be applied to various applications such as communications, surveillance, and medicine. For instance, the periodic signal can be a communication signal, a surveillance signal such as an image, or a monitoring signal which may not even have a time structure (multidimensional random variables). As one example, correntropy TPCA can be used to detect a number of users in an allocated frequency band of a communication signal prior to assigning new users to the allocated frequency band. As a practical example, correntropy TPCA (CTPCA) can be applied to a sinusoidal signal corrupted with impulsive noise for illustrative purposes $$x(m)=\sin(2\pi fm)+A\cdot z(m) \quad (15)$$

for m=1, 2, . . . , N+L−1. z(m) is a white noise process drawn from the PDF $$p_N(n)=0.8\times N(0,0.1)+0.1\times N(4,0.1)+0.1\times N(-4,0.1) \quad (16)$$

In the example, N=256, f=0.3 and 3N data is generated to estimate N point autocorrelation and correntropy functions. In TPCA, a larger subspace (larger L) produces a higher the Signal Noise Ratio (SNR). For a fair comparison, an N-by-N Gram matrix is eigen-decompose for both conventional TPCA and correntropy TPCA. Results of eigen-decomposing an L-by-L autocorrelation matrix and then projecting the data are also presented for comparison. For each case, 1000 Monte Carlo trials with different noise realizations are run to evaluate the improvement of CTPCA over TPCA. For A=5, a probability of detecting the sinusoidal signal successfully as the largest peak in the spectrum is 100% for CTPCA, compared with 15% for N-by-N autocorrelation. The kernel size is set to σ=1 in CTPCA throughout the simulation. In this particular application of finding sinusoids in noise, the kernel size can be scanned until the best line spectrum is obtained.

In CTPCA, the transformed data may not be centered in the feature space and the mean can introduce a large DC component that is picked as the first principal component. This can be shown as follows. We denote C as the correntropy matrix, $C_c$ as the centered correntropy matrix, $m_\eta$ as the mean of the transformed data, $1_N$ as an N-by-1 column vector with all entries equal to 1 and $1_{N\times N}$ as an N-by-N matrix with all entries equal to 1. Thus, $$C_c = C - m_\eta^2 \cdot 1_N \cdot 1_N^T \quad (17)$$

If the eigenvector $1_N$ is normalized to a unit norm, the corresponding eigenvalue is $Nm_\eta^2$ which can be very large if N is large as in this example. Therefore, the first principal component of the correntropy matrix in this example is always a DC component. Accordingly, a second principal component can be used in place of the first principal component. Another way to center the correntropy matrix is to estimate the square of the mean in (17) directly by the Information Potential (IP) as shown in EQ (4) to EQ (6).

$$C_c = C - 1_{N\times N} \cdot C/N - C \cdot 1_{N\times N}/N + 1_{N\times N} \cdot C \cdot 1_{N\times N}/N^2 \quad (18)$$

Figure 7:
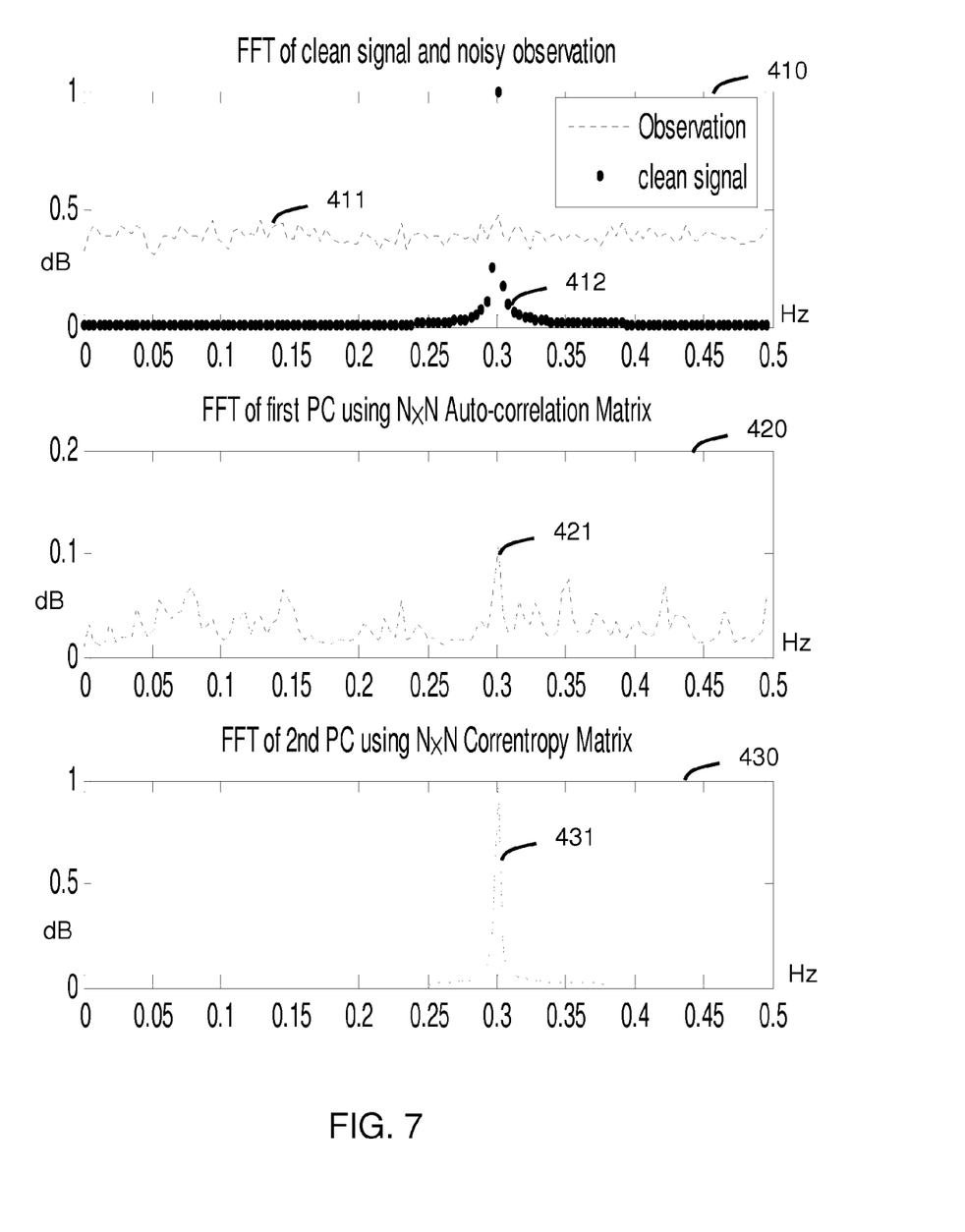
FIG. 7 is an exemplary illustration for signal detecting using correntropy based on a power spectral density (PSD) of the correntropy in accordance with the invention.

FIG. 7 shows a spectral analysis using CTPCA for the sinusoidal signal EQ (15) corrupted with impulsive noise of EQ (16). Subplot 410 shows the observation spectrum 411 which is the sinusoidal signal of EQ (15) corrupted with noise, and the "clean" spectrum 412 of EQ (15). Notably, the clean spectrum 412 shows a strong line spectrum at 0.3 Hz which corresponds to the fundamental frequency of the sinusoidal signal. In contrast, the observation spectrum 411 is corrupted with high amplitude noise and essentially buries the line spectrum component of the sinusoidal signal. That is, the observation spectrum does not noticeably reveal a presence of the sinusoidal component 412.

Subplot 420 shows an FFT of the first principal component of CTPA. A small amplitude line spectrum 421 occurs at the frequency of the sinusoidal signal. However, the magnitude of the line spectrum is not significantly higher than the average spectral magnitude, and is not suitable for robust detection.

Subplot 430 shows an FFT of the second principal component of CTPA (i.e. centering CPCA). Notably, the line spectrum 431 of the sinusoidal signal is more pronounced than the line spectrum 421 in Subplot 420, and provides for more robust detection.

Figure 8:
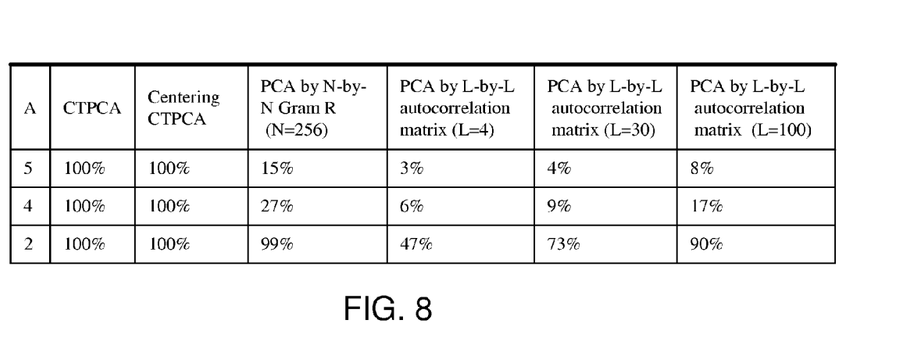
FIG. 8 is a table presenting PCA performance comparisons.

FIG. 8 shows a comparison of PCA methods: Correntropy TPCA (CTPCA), Centering CTPCA, PCA by N×N Gram R, and PCA by L-by-L autocorrelation matrix with various lengths. Results of the simulation indicate that the method of CTPCA and Centering CTPCA outperforms the other evaluated methods.

Figure 9:
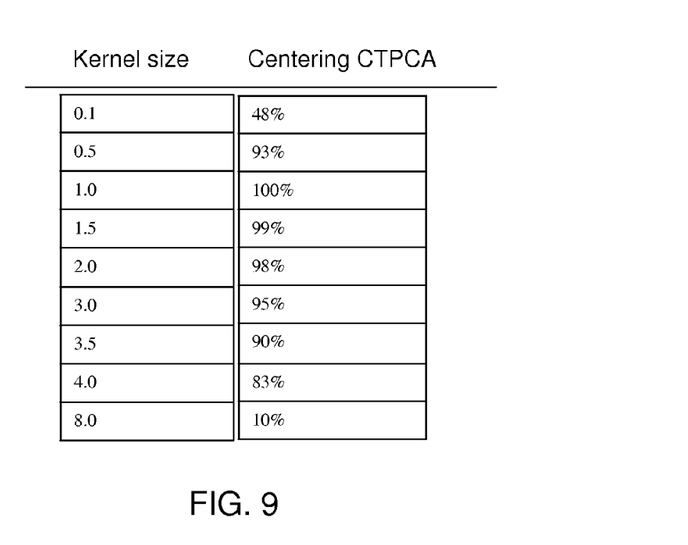
FIG. 9 is a table identifying effects of kernel size on TPCA performance.

FIG. 9 presents a table showing the effects of kernel size on correntropy CTPCA. Results of the simulation indicate that a kernel size of 1 provides the highest detection performance.

Detailed embodiments of the present method and system have been disclosed herein. However, it is to be understood that the disclosed embodiments are merely exemplary, and that the invention can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

The term "processing" can be defined as number of suitable processors, controllers, units, or the like that carry out a pre-programmed or programmed set of instructions. The terms "program," "software application," and the like as used herein, are defined as a sequence of instructions designed for execution on a computer system. A program, computer program, or software application may include a subroutine, a function, a procedure, an object method, an object implementation, an executable application, a source code, an object code, a shared library/dynamic load library and/or other sequence of instructions designed for execution on a computer system.

For example, the above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

What is claimed is:

1. A method for detecting a periodic signal in a noisy signal, the method comprising:
monitoring a noisy signal for a periodic component;
applying correntropy to the noisy signal to generate a non-linear mapping; and
applying a sub-space projection to the non-linear mapping to produce principal components that identify a frequency of the periodic component.

2. The method of claim 1, further comprising choosing a principal component according to a signal energy to detect the periodic component.

3. The method of claim 2, further comprising:
performing a power spectral density (PSD) of a correntropy derived principal component; and
identifying a maximum peak in the PSD, wherein the maximum peak corresponds to the frequency of the periodic component.

4. The method of claim 1, wherein the step of applying correntropy generates a non-linear autocorrelation matrix from the non-linear mapping.

5. The method of claim 4, wherein the step of applying a sub-space projection includes performing Temporal Principal Component Analysis (TPCA) on the non-linear autocorrelation matrix.

6. The method of claim 2, further comprising using at least a second principal component for detecting the periodic component.

7. The method of claim 1, wherein the step of applying correntropy further comprises:
applying a correntropy kernel to input data to generate a Gram matrix, wherein the correntropy kernel maps the input data to a reproducing kernel Hilbert Space (RKHS).

8. The method of claim 7, wherein the step of applying the sub-space projection further comprises eigen-decomposing the Gram matrix to produce eigen-vectors of the principal components.

9. The method of claim 7 wherein the correntropy kernel establishes a size of the Gram matrix.

10. The method of claim 7 wherein a length of the Gram matrix corresponds to a desired number of principal components.

11. A method for Correntropy Principal Component Analysis (CPCA), the method comprising:
applying correntropy to an input data of a noisy signal to generate a non-linear autocorrelation matrix; and
performing Principal Component Analysis on the non-linear autocorrelation matrix to produce correntropy principal components that identify a frequency of a periodic component.

12. The method of claim 11, wherein the correntropy projects the input data to a linear reproducing kernel Hilbert Space (RKHS) to produce the non-linear autocorrelation matrix.

13. The method of claim 12, wherein the RKHS has a same dimension as the input data.

14. The method of claim 11, wherein correntropy includes applying a correntropy kernel to the input data to map the input data to a reproducing kernel Hilbert Space (RKHS).

15. The method of claim 14, wherein the correntropy kernel is obtained by an expected value of a positive definite function.

16. The method of claim 14, wherein the correntropy kernel induces a scalar non-linear mapping that retains a measure of similarity in the input data.

17. A system for monitoring a noisy signal that has a sine wave component, the system comprising a processor to:
apply a non-linear subspace projection to the noisy signal in accordance with correntropy to generate a Gram matrix;
decompose the Gram matrix to produce correntropy principal components; and
detect the sine wave component from the correntropy principal components.

18. The system of claim 17, wherein the processor selects at least one principal component having a high energy characteristic;
generates a frequency spectrum of the at least one principal component; and
detects a peak in the frequency spectrum, wherein the peak identifies the frequency of the sine wave component.

19. The system of claim 18, wherein the at least one principal component represents at least one of a communication signal, a radar signal, a surveillance signal, and a monitoring signal.

20. The system of claim 18, wherein the processor:
   detects a number of users in an allocated frequency band of a communication signal prior to assigning new users to the allocated frequency band.

21. The system of claim 17, wherein the processor applies a positive definite function to the noisy signal to generate entries of the Gram matrix.

22. The system of claim 21, wherein the positive definite function induces a non-linear mapping in a linear reproducing kernel Hilbert Space.

23. The system of claim 19, wherein the positive definite function is a Gaussian kernel.

24. The system of claim 17, wherein the Gram matrix has an input dimension equal to a number of desired principal components.

* * * * *